Oct. 19, 1926.
A. S. WYSONG
1,603,889
INTERNAL COMBUSTION ENGINE AND PROCESS FOR USING FUELS
Original Filed Jan. 31, 1924    3 Sheets-Sheet 1
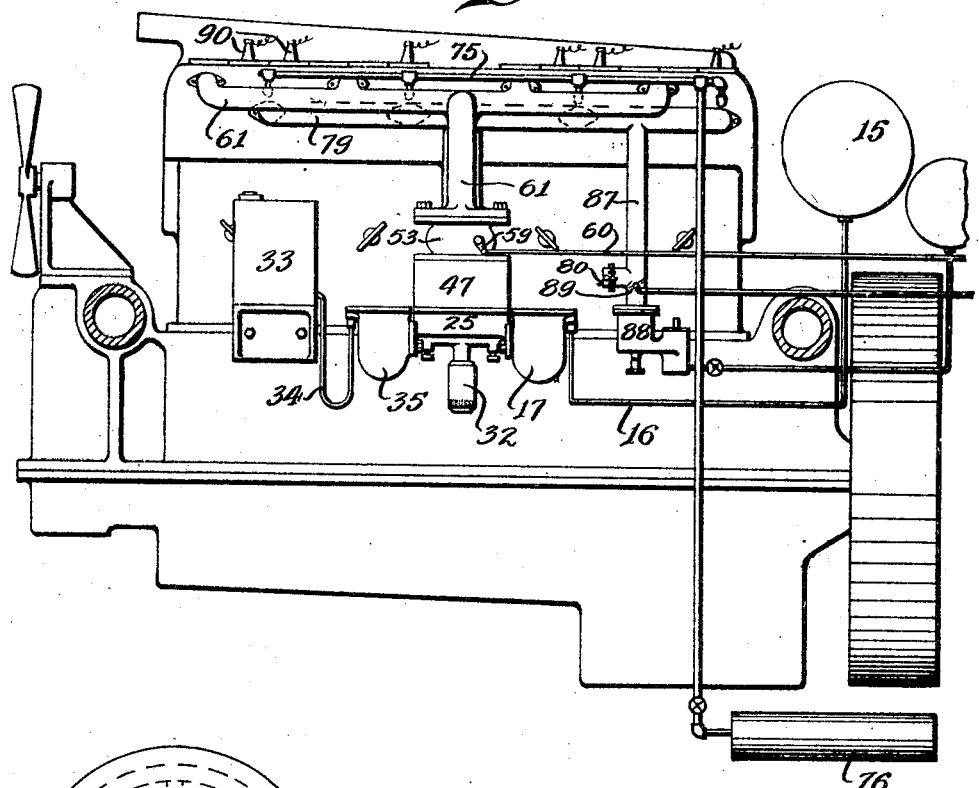
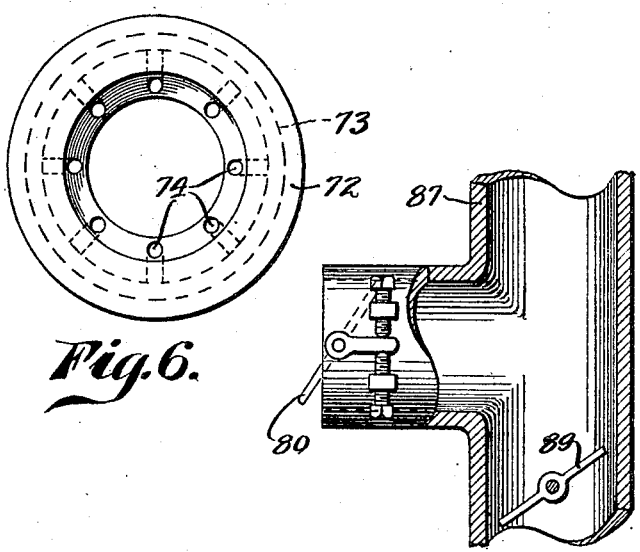
INVENTOR.
Ansel S. Wysong Oct. 19, 1926.
A. S. WYSONG
INTERNAL COMBUSTION ENGINE AND PROCESS FOR USING FUELS
Original Filed Jan. 31, 1924   3 Sheets-Sheet 2
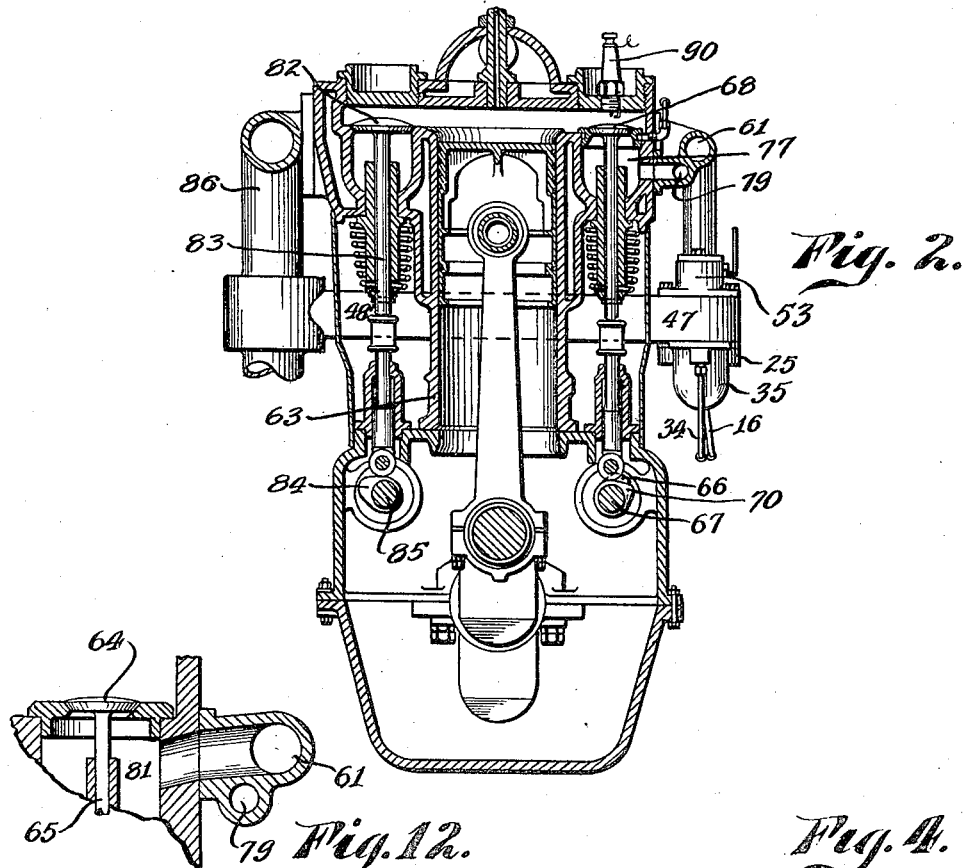
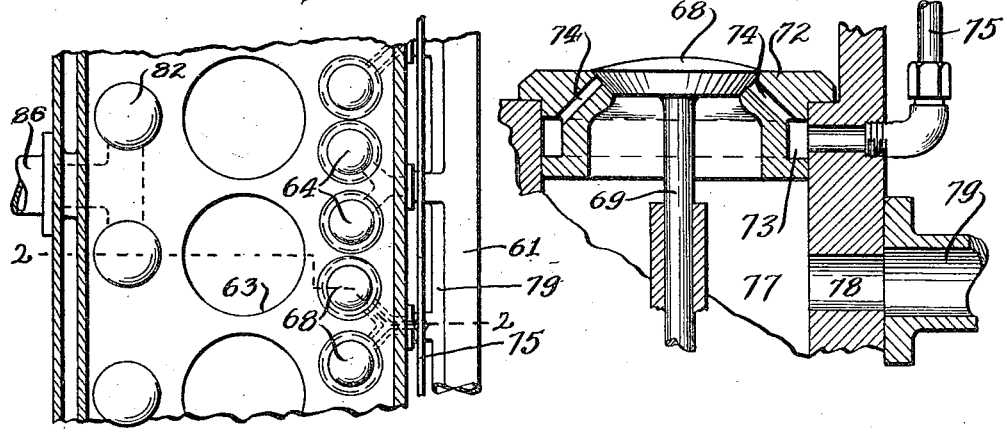
INVENTOR.
Ansel S. Wysong

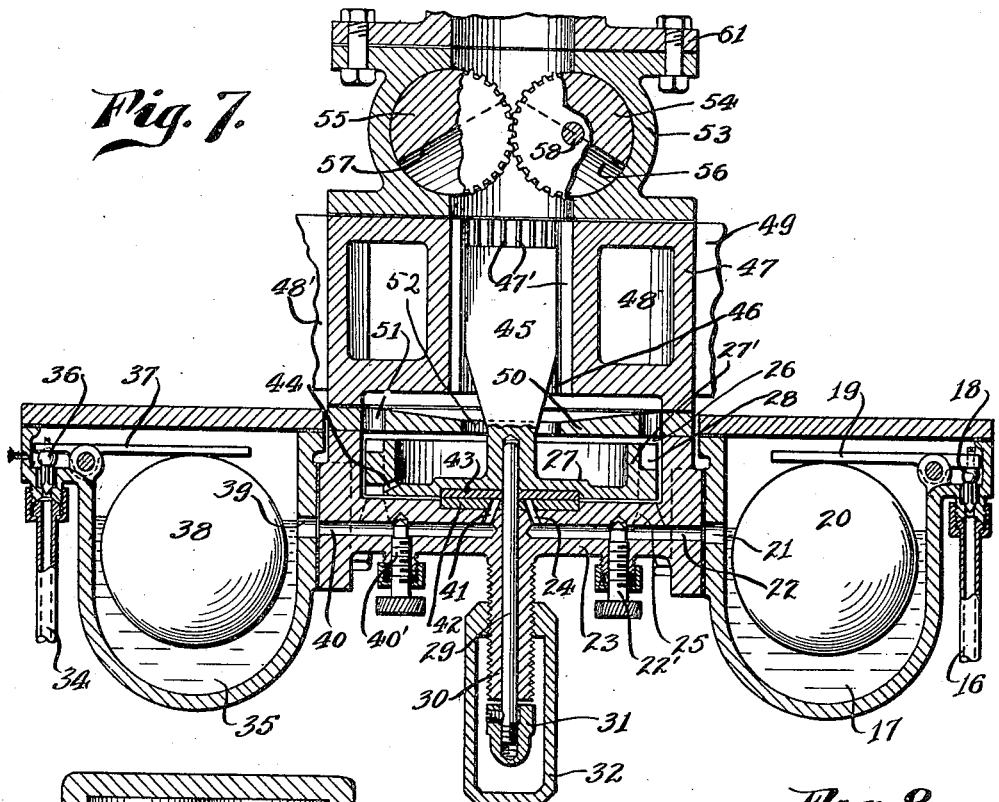

Patented Oct. 19, 1926.

1,603,889

UNITED STATES PATENT OFFICE.

ANSEL S. WYSONG, OF LOS ANGELES, CALIFORNIA, ASSIGNOR TO INTERNATIONAL GAS, POWER AND APPLIANCE COMPANY, OF LONG BEACH, CALIFORNIA, A CORPORATION.

INTERNAL-COMBUSTION ENGINE AND PROCESS FOR USING FUELS.

Application filed January 31, 1924, Serial No. 689,711. Renewed July 20, 1926.

My invention relates primarily to internal combustion engines designed to use as their principal fuel heavy fuel oils, and the object thereof is to provide an engine in which the principal charge of heavy fuel oil and water vapor may be ignited by a small charge of gas and air and the combined charge used in operating the engine.

In the drawings forming a part of this application:

Figure 1 is a side elevation of my improved engine;

Fig. 2 is a central vertical cross-section on the line 2—2 of Fig. 3;

Fig. 3 is a fragmentary top plan of certain valves;

Figs. 4 to 6 are details of certain of the parts of the engine, some of which are on an enlarged scale;

Fig. 7 is an enlarged central vertical section of the carburetor and throttle valve;

Fig. 8 is a bottom plan of the carburetor;

Fig. 9 is a top plan of the carburetor with parts broken out for illustration;

Fig. 10 is a side elevation of a part of the carburetor;

Fig. 11 is an enlarged detail of the throttle valve;

Fig. 12 is a detail of one of the admission valves.

Referring to the drawings, 15 is the oil tank in which the heavy fuel oil is housed. A pipe 16 connects tank 15 with the casing of oil chamber 17 of the carburetor. A valve 18 (see Fig. 7) controlled by lever 19 regulates the flow of oil into the chamber. Lever 19 is operated by float 20 to cut off the flow of oil into chamber 17 when it rises therein to a predetermined height. A port 21 in the casing of chamber 17 is connected by channel 22 in rib 23 with an inclined port 24 in the bottom of the casing 25 of the wheel chamber 26. A needle valve 22′ controls channel 22. In chamber 26 is a cup-shaped wheel 27 having helical vanes 28 on its peripheral rim 27′. This wheel is mounted on shaft 29 which projects through an externally threaded boss 30 projecting from the bottom of casing 25. A regulating nut 31 is secured upon the bottom of shaft 29 to prevent wheel 27 from rising too high when being operated. A casing 32 screws upon boss 30 and is filled with oil to lubricate shaft 29 when in operation. A water tank 33 is connected by pipe 34 with the casing of water chamber 35 of the carburetor (see Fig. 7). A valve 36 controlled by lever 37 regulates the flow of water into the chamber. Lever 37 is operated by float 38 to cut off the flow of water into chamber 35 when it rises to a predetermined height. A port 39 in the casing of chamber 35 opens into channel 40 connected by inclined port 41 with chamber 26. A needle valve 40′ controls channel 40. A friction plate 42 surrounds shaft 29 and is pierced by ports 24 and 41. Plate 42 is an insert in the bottom of chamber 26. In the bottom of wheel 27 is inserted a friction plate 43 which when the wheel is inoperative closes ports 24 and 41. Wheel 27 has drainage ports 44 which open below vanes 28 to permit any liquid that falls into the cup-shaped top of the wheel to pass out of the same, when the wheel is actuated. Projecting upwardly from the hub of wheel 27 is a flat vane 45 which is just a little narrower than the discharge outlet 46 of the carburetor. Casing 47 has a chamber 48 therein which is connected by pipe 49 with the exhaust from the engine and when the engine is being operatel exhaust gases pass through chamber 48 and out through pipe 48′ and keep the inner walls thereof hot enough to vaporize any water or oil that may be thrown against the same by vane 45. The surface of casing 47 which forms the discharge outlet is preferably provided with vertical ribs 47′. The top of chamber 26 is covered by baffle plate 50 which is pierced by holes 51 located above vanes 28 and has a central aperture 52 through which vane 45 passes. The upper surface of plate 50 slopes downwardly toward aperture 52 to direct any liquid that may fall thereon through said aperture into the cup-shaped top of wheel 27 from which it passes through ports 44 and is again subjected to the atomizating effects of vanes 28.

To the top of casing 47 is secured the throttle valve casing 53 in which is mounted the throttle valve. The throttle valve is composed of the cylinders 54 and 55 which have semi-circular notches 56 and 57 therein. When notches 56 and 57 are in opposition, as shown in Fig. 11, there is a circular opening through the valve. One of the cylinders, 54, has its shaft 58 projecting through the cover of casing 53 and is provided with lever 59, which lever is operated by wire 60 which runs to the steering wheel. Casing 53 is secured to the manifold 61 of the engine, the upper end of which runs to and along all the cylinders of the engine. In the bottom of the casing of the wheel chamber are air ports 62 which open below vanes 28. Each piston cylinder 63 of the engine has two intake or admission valves which are shown in Fig. 3 and in enlarged detail in Figs. 4 and 12. Valve 64 controls the admission of fuel which passes through manifold 61 and is of the usual poppet valve type and has a stem 65 which is operated by cam 66 on cam shaft 67. The other admission valve 68 is also of the usual poppet valve type and has a stem 69 which is operated by cam 70 on cam shaft 67. In the casing 72 forming a seat for valve 68 is an annular chamber 73 from which lead ports 74 that are closed by valve 68 when it is seated. Chamber 73 is connected by pipe 75 with the presto lite gas supply in tank 76 or to an acetylene gas generator. Below valve 68 is a chamber 77 which is connected by port 78 to air manifold 79, the top portion of which runs along all the cylinders and has a regulating valve 80 to control the admission of air into the manifold. Below valve 64 is a chamber 81 which is connected to manifold 61. The engine is provided with the usual exhaust valves 82 having stems 83 operated by cams 84 on shaft 85 and exhaust manifold 86 and is cranked by any appropriate means.

For starting purposes the intake manifold 79 may have opening thereinto a tube 87 which runs from carburetor 88 of any approved make which operates in the usual manner with gasolene and air and is controlled by a throttle valve shown at 89 in Fig. 1. This carburetor can be used in conjunction with the other fuel device before described or it can be cut out by the throttle valve after the engine is warmed up. While warming up the engine I prefer to close throttle 55 to cut out the heavier fuel. With throttle valve 55 operative and the engine running, the suction of the piston draws wheel 27 upwardly and encloses ports 24 and 41 and oil and water is sucked upwardly around the periphery of the wheel and at the same time air is sucked in through ports 51 and impinges against vanes 28, thereby causing wheel 27 to revolve. The revolution of wheel 27 and its vanes 28 atomizes the oil and water drawn through ports 24 and 41 and makes a fine emulsion of the same which passes up through ports 51 of plate 50 into the path of revolution of vane 45. Vane 45 throws the emulsion against the walls of discharge outlet 46, thereby vaporizing the same. Should there be any portions of oil or water too large to be vaporized they will fall down in the cup-shaped top of the wheel and be thrown out through ports 44 into the path of vanes 28 and again be subjected to the action thereof and of vane 45. The vaporized fuel will then pass through valve 64 into the cylinder of the engine.

Cams 66 and 70 are so made and timed that valve 64 is opened through approximately three-fourths of the suction stroke and then closed and valve 68 is opened for the remainder of the stroke and then closed. By this operation the heavier fuel admitted through valve 64 which is not volatile enough to be exploded in the cylinder is at the outer end of the cylinder at the end of the suction stroke and the lighter fuel admitted through valve 68 which is volatile enough to be exploded is at the inner end of the cylinder and when the fuel is compressed this lighter fuel surrounds and contacts with spark plug 90 and is exploded and generates sufficient heat to ignite the heavier fuel.

In practice I prefer to use acetylene gas to ignite the heavier fuel and to use it with an equal quantity of air but a less or greater amount of air may be used with the gas. The vaporized or commingled heavy hydrocarbon liquid fuel and water I term the heavier fuel. The acetylene gas and air, and gasolene and air I term the lighter fuel.

When I use acetylene gas and air I prefer to use the admission valve shown in detail in Fig. 4 as the gas and air are mixed together and with the other fuel within the cylinders thereby obviating any danger of a backfire igniting any part of the machine.

I may use gasolene as a heavy oil.

Having described my invention, I claim:
1. In an internal combustion engine, means to atomize and commingle heavy hydrocarbon liquid fuel and water; means to commingle acetylene gas and air; means to admit the heavier fuel into the cylinders during the first and greater portion of the suction stroke, means to admit the lighter fuel into the cylinders during the remainder of the suction stroke, in combination with means to ignite the lighter fuel, whereby the heavier fuel is ignited.

2. In an internal combustion engine, means to atomize and commingle heavy hydrocarbon liquid fuel and water comprising an elevated liquid hydrocarbon fuel tank; a float chamber, a connection from said tank to said chamber; a valve on said connection; a float in said chamber to control said valve; a wheel chamber; a wheel revolubly mounted in said chamber, said wheel having vanes on the periphery thereof and a flat vane projecting upwardly from the center thereof; a discharge passage surrounding said upright vane; ports and a channel connecting said float chamber and wheel chamber; an elevated water tank; a float chamber connected thereto; a valve on said last connection; a float in said last float chamber to control said valve; ports and a channel connecting said last float chamber with said wheel chamber, said wheel chamber having air ports in the bottom thereof below the vanes of the wheel.

3. In an internal combustion engine, a cylinder having two intake ports opening thereinto; valves controlling said ports; means to supply comminuted heavy liquid fuel and water through one of said ports through the greater portion of the first part of the suction stroke, means to supply comminuted lighter hydrocarbon fuel through the other port during the remainder of the suction stroke; in combination with means to comminute said fuel; and other means to ignite the lighter fuel.

4. In an internal combustion engine, means for violently agitating and atomizing a hydrocarbon fuel, means to commingle acetylene gas and air, means to admit only the heavier atomized fuel into the engine cylinders during the first and greater portion of the suction stroke, means to admit the acetylene gas and air into the cylinders only during the remainder of the suction stroke in combination with means to ignite the lighter fuel whereby the heavier fuel is ignited.

5. In an internal combustion engine, means for violently agitating and atomizing heavier liquid fuel, means to commingle acetylene gas and air, a cam actuated valve so timed in its operation as to admit only the heavier atomized fuel into the engine cylinders during the first and greater portion of the suction stroke, a cam actuated valve so timed in its operation as to admit the acetylene gas and air into the cylinders only during the remainder of the suction stroke in combination with means to ignite the lighter fuel whereby the heavier fuel is ignited.

6. The herein described process of using fuel in internal combustion engines which consists of filling the larger portion of the cylinder during the first part of the suction stroke with heavy fuel and finishing the full charge with a lighter fuel during the remaining portion of the suction stroke; then compressing and firing the charge.

7. In an internal combustion engine, a hydrocarbon source of supply, a piston and a cam actuated valve so timed in its operation as to admit only the hydrocarbon fuel from said source of supply during the first part of the piston stroke, an acetylene source of supply, a cam actuated valve so timed in its operation as to admit acetylene into the engine only during the remainder of the suction stroke, and means for igniting the fuel in the engine in approximation to the place where the acetylene is admitted to the engine.

8. In an internal combustion engine, means for atomizing a heavy hydrocarbon fuel, means to commingle a lighter and more inflammable fuel with air, means to permit only the heavy atomized fuel into the engine cylinders during the first and greater portion of a suction stroke, means to admit the lighter and more inflammable fuel and air into the cylinders only during the remainder of the suction stroke in combination with means to ignite the lighter fuel whereby the heavier fuel is ignited.

9. In an internal combustion engine, a heavy hydrocarbon source of supply, a piston and a cam actuated valve so timed in its operation as to admit only the heavy hydrocarbon fuel from said source of supply during the first part of the piston stroke, a source of supply of a more volatile and inflammable fuel, a cam actuated valve so timed in its operation as to admit more volatile and inflammable fuel into the engine only during the remainder of the suction stroke and means for igniting the fuel in the engine.

10. The combination of an internal combustion engine, and means for delivering vaporized oil together with acetylene gas to the engine cylinders in regulated proportions.

11. The combination of an internal combustion engine, means for delivering vaporized oil together with acetylene gas to the engine cylinders in regulated proportions, and means for preheating the oil vapors.

12. In an internal combustion engine, means for vaporizing oil and delivering the vapors to the engine cylinders, and means for delivering acetylene to the vaporized oil in the engine intake.

13. In an internal combustion engine, means for vaporizing oil and delivering the vapors to the engine cylinders, means for delivering acetylene to the vaporized oil in the engine intake, and means for preheating the oil vapors preceding the admixing of the acetylene gas therewith.

In witness that I claim the foregoing I have hereunto subscribed my name this 22nd day of January, 1924.

ANSEL S. WYSONG.